United States Patent
Tokito

(10) Patent No.: US 10,784,752 B2
(45) Date of Patent: Sep. 22, 2020

(54) INVERTER PROTECTING STRUCTURE

(71) Applicant: Toyota Jidosha Kabushiki Kaisha, Toyota-shi, Aichi-ken (JP)

(72) Inventor: Aya Tokito, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 16/265,559

(22) Filed: Feb. 1, 2019

(65) Prior Publication Data

US 2019/0245415 A1 Aug. 8, 2019

(30) Foreign Application Priority Data

Feb. 2, 2018 (JP) .................. 2018-017242

(51) Int. Cl.
*H02K 11/33* (2016.01)
*H02K 7/00* (2006.01)
*B60L 50/00* (2019.01)
*B62D 25/08* (2006.01)

(52) U.S. Cl.
CPC .......... *H02K 11/33* (2016.01); *H02K 7/006* (2013.01); *B60L 50/00* (2019.02); *B60Y 2200/91* (2013.01); *B60Y 2306/01* (2013.01); *B60Y 2400/61* (2013.01); *B62D 25/08* (2013.01)

(58) Field of Classification Search
CPC .......... H02K 11/33; H02K 7/006; H02K 7/00; B60L 50/00; B60Y 2200/91; B60Y 2306/01; B60Y 2400/61

USPC ....................................................... 310/68 D
See application file for complete search history.

(56) References Cited

U.S. PATENT DOCUMENTS

| | | | | |
|---|---|---|---|---|
| 1,360,482 A | * | 11/1920 | Wiard ............ | H02K 1/185 310/57 |
| 6,773,850 B2 | * | 8/2004 | Saito ............. | H01M 2/043 180/68.5 |
| 7,688,582 B2 | * | 3/2010 | Fukazu ........... | B60L 50/66 361/690 |
| 2006/0048984 A1 | * | 3/2006 | Pleune ........... | B60K 11/04 180/68.4 |
| 2015/0121767 A1 | * | 5/2015 | Nagamori ........ | B60K 1/00 49/463 |
| 2017/0088182 A1 | | 3/2017 | Hara | |

FOREIGN PATENT DOCUMENTS

| | | | | |
|---|---|---|---|---|
| JP | 2013-237413 A | | 11/2013 | |
| JP | 2016145017 | * | 8/2016 | ......... Y02T 10/7241 |
| JP | 2016-159783 A | | 9/2016 | |
| JP | 2017-065474 A | | 4/2017 | |

* cited by examiner

*Primary Examiner* — Terrance L Kenerly
(74) *Attorney, Agent, or Firm* — Dinsmore & Shohl LLP

(57) ABSTRACT

An inverter protecting structure includes an inverter that supplies driving electric power to a traction motor, and a protection cover that covers the inverter. A surface of the protection cover facing an upper surface of the inverter has corrugation. A first bolt mounted on the upper surface of the inverter is disposed under a recess of the corrugation.

7 Claims, 3 Drawing Sheets

INVERTER PROTECTING STRUCTURE

CROSS-REFERENCE TO RELATED APPLICATIONS

This application claims priority to Japanese Patent Application No. 2018-017242 filed on Feb. 2, 2018, which is incorporated herein by reference in its entirety including the specification, drawings and abstract.

BACKGROUND

1. Technical Field

A technique in the present disclosure relates to a inverter protecting structure that is disposed at a rear part of a vehicle.

2. Description of Related Art

Various electric components are installed in an electric vehicle. In the electric vehicle of Japanese Patent Application Publication No. 2017-065474 (JP 2017-065474 A), a pump inverter, a DC-DC converter, and an unit inverter are installed at a rear part of the vehicle. The devices are covered with a cover. In the electric vehicle of Japanese Patent Application Publication No. 2013-237413 (JP 2013-237413 A), an inverter that supplies electric power to a motor for driving front wheels is installed at a front part of the vehicle. This inverter is covered with a cover. In the electric vehicle of Japanese Patent Application Publication No. 2016-159783, a rear inverter that supplies electric power to a motor for driving rear wheels is disposed at a rear part of the vehicle.

SUMMARY

The term "electric vehicle" used in the present specification means a vehicle equipped with a traction motor, and includes a hybrid electric vehicle equipped with an engine along with a motor and a fuel cell electric vehicle equipped with a fuel cell as a power source.

Some vehicles have important electric components covered with a cover for protection (protection cover) as in the electric vehicles disclosed in JP 2017-065474 A and JP 2013-237413 A. An inverter disposed at a rear part of the vehicle is sometimes also covered with a protection cover. Some protection covers are corrugated to enhance the strength of the protection cover. On the other hand, in some cases a bolt is mounted on an upper surface of the inverter. If a lower surface of the protection cover has corrugation and a protruding portion of the corrugation is disposed so as to face the bolt on the upper surface of the inverter in a vehicle-height direction, the protruding portion of the lower surface of the protection cover collides with the bolt when the protection cover is crushed by another vehicle colliding with the vehicle from behind. In that case, a load is transferred from above to a casing of the inverter through the protruding portion and the bolt, and this load concentrates around the bolt. This may result in damage to the casing of the inverter around the bolt.

The present disclosure relates to a inverter protecting structure that is disposed at a rear part of a vehicle. The inverter protecting structure disclosed in the present disclosure includes an inverter that is configured to supply driving electric power to a traction motor, and a protection cover that covers the inverter. A surface of the protection cover facing an upper surface of the inverter (a lower surface of the protection cover) has corrugation. A first bolt mounted on the upper surface of the inverter is located under a recessed portion of the corrugation of the lower surface of the protection cover. In the inverter protecting structure, the protruding portion of the corrugation of the lower surface of the protection cover is disposed so as to circumvent the first bolt on the upper surface of the inverter. Even if the protection cover having the above-described structure is crushed from above, the protruding portion of the corrugation of the lower surface of the protection cover is not likely to come into contact with the first bolt, so that concentration of a load around the first bolt on the inverter is not likely to occur. The corrugation of the lower surface of the protection cover may be typically beads that are formed at the same time as when the protection cover is produced by press working.

The protection cover may be fixed with a second bolt to a vehicle framework member located rearward of the inverter, and may be inclined so as to slope upward toward a vehicle front side from a fixing position of the second bolt. Thus, an impact received from another vehicle colliding with the vehicle from behind can be diverted away toward an obliquely upper side so as to suppress deformation of the protection cover due to the impact. As a result, the positional relationship between the first bolt on the upper surface of the inverter and the corrugation of the lower surface of the protection cover is maintained, and the protruding portion of the corrugation can be prevented from hitting the first bolt.

Details and further improvements of the technique in the present disclosure will be described in "Detailed Description of Embodiments" below.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
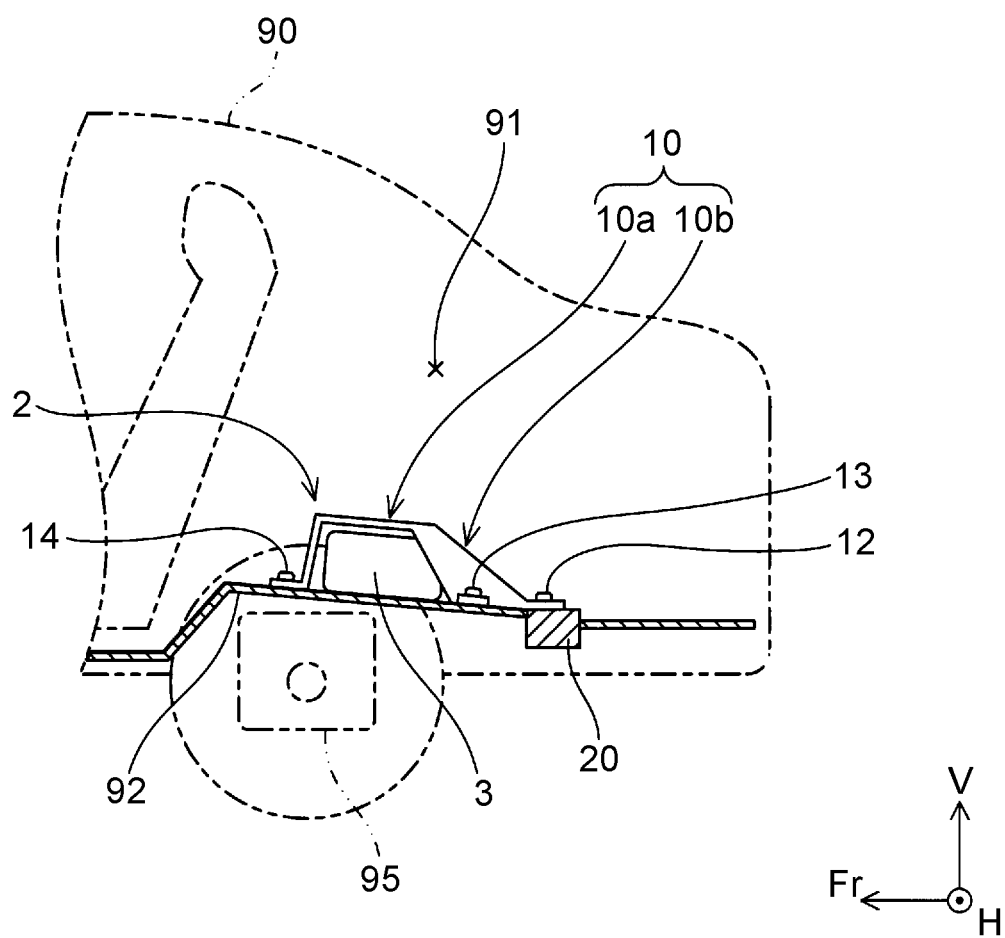
FIG. 1 is a side view of a rear part of an electric vehicle that employs a inverter protecting structure of an embodiment.
Figure 2:
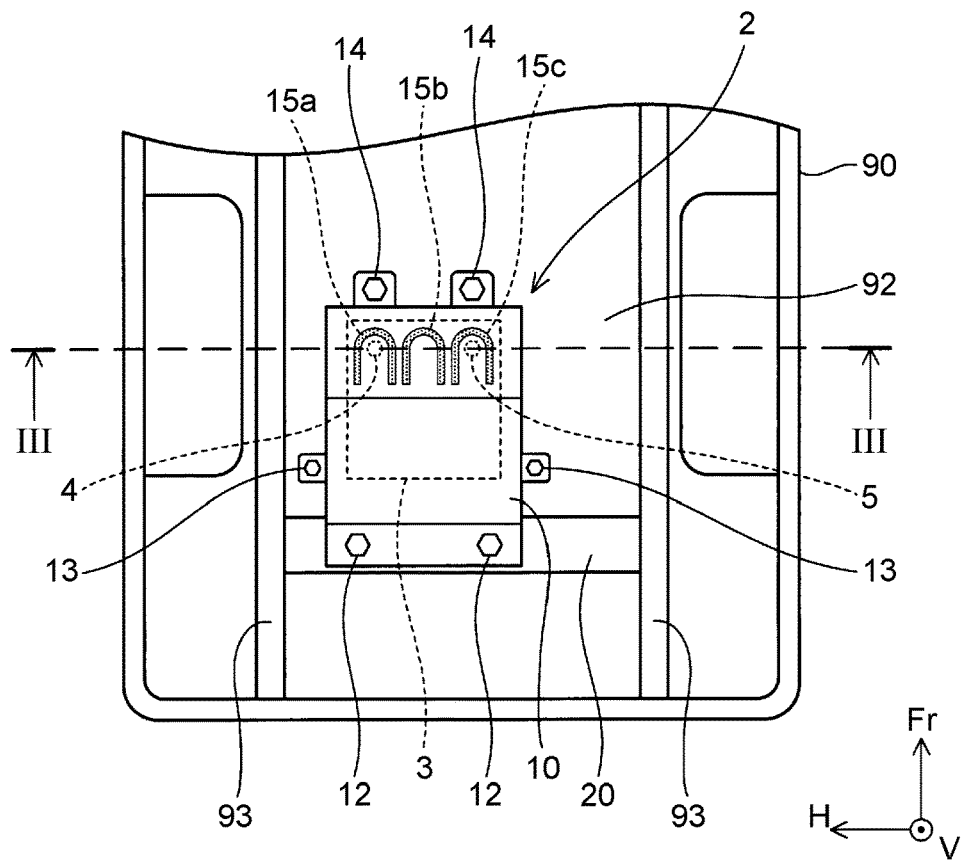
FIG. 2 is a plan view of the rear part of the electric vehicle.

An inverter protecting structure 2 of an embodiment will be described with reference to the drawings. FIG. 1 is a side view of a rear part of an electric vehicle 90 that employs the inverter protecting structure 2 of the embodiment. FIG. 2 is a plan view of the rear part of the electric vehicle 90. In FIG. 1, the electric vehicle 90 and a rear motor 95 are depicted by imaginary lines to clarify the arrangement of an inverter 3. FIG. 2 shows a state where a trunk lid at the rear part of the vehicle has been removed. In the coordinate system of FIG. 2, a positive direction along an Fr-axis indicates a vehicle front side. A V-axis of the coordinate system indicates a vehicle upper side. An H-axis indicates a vehicle left side.

The orientations of the axes of the coordinate system relative to the vehicle are the same in all the drawings.

The electric vehicle 90 has a traction front motor (not shown) installed in a front space of the vehicle and the rear motor 95 installed in a rear space 91. The rear motor 95 drives rear wheels. The inverter 3 disposed in the rear space 91 converts direct-current power output from a battery (not shown) into alternating-current power for driving the rear motor 95, and supplies the alternating-current power to the rear motor 95.

The inverter 3 is covered with a protection cover 10. The protection cover 10 is provided to protect, from the impact of a collision, the inverter 3 to which high voltages of 100 volts or higher are applied. The impact assumed here is an impact in a case where the vehicle is rear-ended by another vehicle. When the electric vehicle 90 is rear-ended by another vehicle, the other vehicle may run onto the rear part of the electric vehicle 90 and move forward to above the inverter 3. The protection cover 10 is provided to protect the inverter 3 from the load of the other vehicle in such a case.

The protection cover 10 is fixed with bolts to a rear floor panel 92 and a rear cross member 20. The cross member 20 is a framework member that secures the strength of a vehicle body, and is suspended across a pair of rear side members 93 extending in a vehicle front-rear direction. The rear side members 93 are also vehicle framework members.

A rear part of the protection cover 10 is fixed with two bolts 12 (an example of a second bolt) to the cross member 20. A front part of the protection cover 10 is fixed with two bolts 14 to the floor panel 92. Side parts of the protection cover 10 are also fixed with bolts 13 to the floor panel 92.

As shown in FIG. 1, a rear part 10b of the protection cover 10 is inclined so as to slope upward toward the vehicle front side from the bolts 12 fixed to the cross member 20. The rear part 10b of the protection cover 10 thus inclined can divert an impact received from another vehicle colliding with the electric vehicle 90 from behind, away toward an obliquely upper side. As a result, deformation of a front part 10a of the protection cover 10 can be restrained. The effect of suppressing deformation of the front part 10a of the protection cover 10 will be described later.

The front part 10a of the protection cover 10 covers an upper surface of the inverter 3. On a rear surface of the front part 10a of the protection cover 10 (a surface facing the upper surface of the inverter 3), three U-shaped ribs 15a to 15c are provided. In FIG. 2, the ribs 15a to 15c provided on the rear surface of the protection cover 10 are shown in gray color to help understanding. The ribs 15a to 15c are provided to enhance the strength of the protection cover 10. Corrugation is formed by the ribs 15a to 15c on the rear surface of the protection cover 10.

Two bolts 4, 5 (an example of a first bolt) are mounted on the upper surface of the inverter 3, and the ribs 15a to 15c are provided so as to circumvent the bolts 4, 5. More specifically, the ribs 15a to 15c are provided so as not to overlap the bolts 4, 5 when the inverter 3 and the protection cover 10 are seen in a plan view from above. The protection cover 10 is formed by press working, and the ribs 15a to 15c are beads that are formed by pressing.

Figure 3:
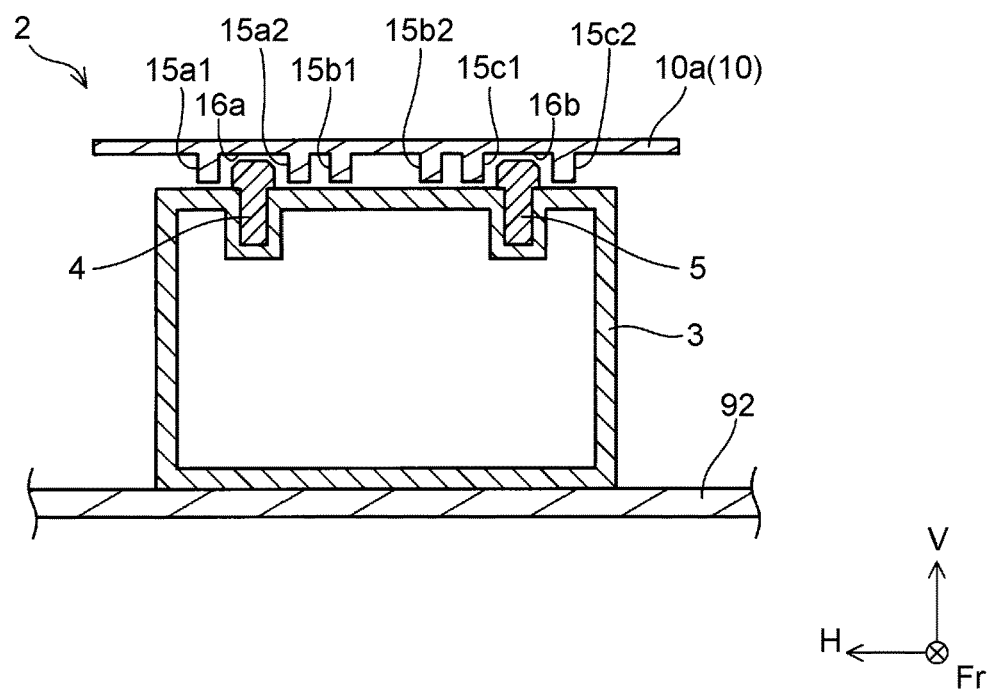
FIG. 3 is a sectional view taken along line III-III in FIG. 2.

FIG. 3 shows a view of section III-III in FIG. 2. In FIG. 3, the ribs on the right and left sides of the bolt 4 located on the left side in FIG. 3 are denoted by reference signs 15a2, 15a1, and the ribs on the right and left sides of the bolt 5 located on the right side in FIG. 3 are denoted by reference signs 15c2, 15c1. The ribs 15a1, 15a2 are portions of the U-shaped rib 15a located on the left side in FIG. 2, and the ribs 15c1, 15c2 are portions of the U-shaped rib 15c located on the right side in FIG. 2. Ribs 15b1, 15b2 in FIG. 3 are portions of the rib 15b at the center in FIG. 2.

As mentioned earlier, corrugation is formed by the ribs 15a to 15c on the rear surface of the protection cover 10. The ribs 15a to 15c correspond to protruding portions of the corrugation, and spaces between the ribs correspond to recesses of the corrugation. Here, a recessed portion between the rib 15a1 and the rib 15a2 will be referred to as a recess 16a, and a recessed portion between the rib 15c1 and the rib 15c2 will be referred to as a recess 16b.

As shown in FIG. 3, the ribs 15a2, 15a1 are located on the right and left sides of the bolt 4. The ribs 15c2, 15c1 are located on the right and left sides of the bolt 5. In other words, the bolt 4 is located between the two ribs 15a1, 15a2, and the bolt 5 is located between the two ribs 15b1, 15b2. In yet other words, the bolt 4 is located under the recess 16a of the corrugation of the lower surface of the protection cover 10, and the bolt 5 is located under the recess 16b of the corrugation.

As mentioned earlier, the protection cover 10 is provided to protect the inverter 3 when the vehicle is rear-ended by another vehicle. The other vehicle rear-ending the vehicle may run onto the protection cover 10. In such a case, the protection cover 10 is in danger of being crushed under a large load from above. The protection cover 10 prevents a colliding vehicle from directly coming in contact with the inverter 3, and can thus protect a connector etc. mounted on the inverter 3 from damage.

If the ribs 15a to 15c of the protection cover 10 are located above the bolt 4 or the bolt 5, a load from above is transferred to the inverter 3 by the ribs 15a to 15c and the bolts 4, 5. Since the ribs 15a to 15c and the bolts 4, 5 are extremely hard, when the load of the weight of another vehicle is transferred through the members to a casing of the inverter 3, the load may concentrate around the bolts 4, 5 and cause damage to the casing. In the inverter protecting structure 2 of the embodiment, the corrugation is formed by the ribs 15a to 15c on the lower surface of the protection cover 10, while the bolts 4, 5 on the upper surface of the inverter 3 are located at the recessed portions (recesses 16a, 16b) of the corrugation of the lower surface. Such a positional relationship between the ribs 15a to 15c and the bolts 4, 5 can prevent a load exerted from above the protection cover 10 from concentrating around the bolts 4, 5 of the inverter 3.

It has been mentioned earlier that the rear part 10b of the protection cover 10 inclined so as to slope upward toward the front side can suppress deformation of the front part 10a of the protection cover 10 when the vehicle is rear-ended by another vehicle. When the front part 10a of the protection cover 10 deforms, the ribs 15a to 15c and the bolts 4, 5 may overlap each other. With the rear part 10b of the protection cover 10 inclined so as to slope upward toward the front side, deformation of the front part 10a of the protection cover 10 is suppressed and the positional relationship between the ribs 15a to 15c and the bolts 4, 5 is maintained. As a result, load concentration around the bolts 4, 5 caused by a load being exerted on portions at which the ribs 15a to 15c and the bolts 4, 5 overlap each other can be avoided as mentioned earlier.

Figure 4:
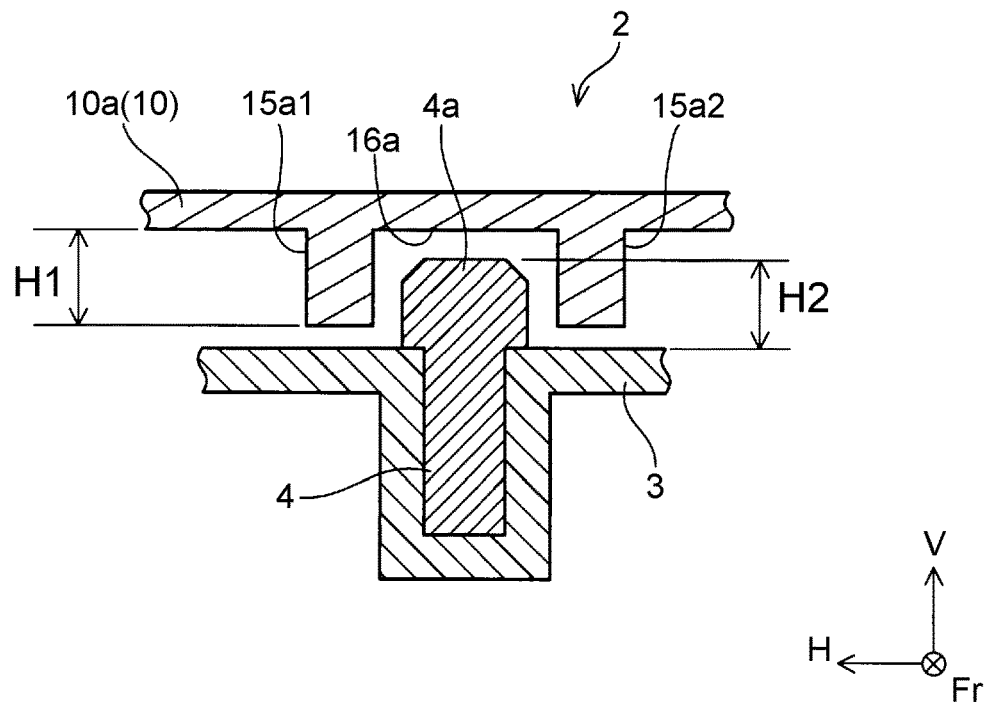
FIG. 4 is a partially enlarged view of the section of FIG. 3.

FIG. 4 shows an enlarged view of a part surrounding the bolt 4 in FIG. 3. It is desirable that a height H1 of the ribs 15a1, 15a2 located on both sides of a head 4a of the bolt 4 be larger than a height H2 of the head 4a. Such a height relationship allows the ribs 15a1, 15a2 to come in contact with the upper surface of the inverter 3 earlier than the head 4a comes in contact with the protection cover 10 when the protection cover 10 is crushed from above. Thus, the force with which the protection cover 10 subjected to a load from above presses down the bolt 4 into the casing of the inverter 3 can be reduced. The height H1 of the ribs 15a1, 15a2 corresponds to the height of the protruding portions of the corrugation formed by the ribs 15a1, 15a2.

Figure 5:
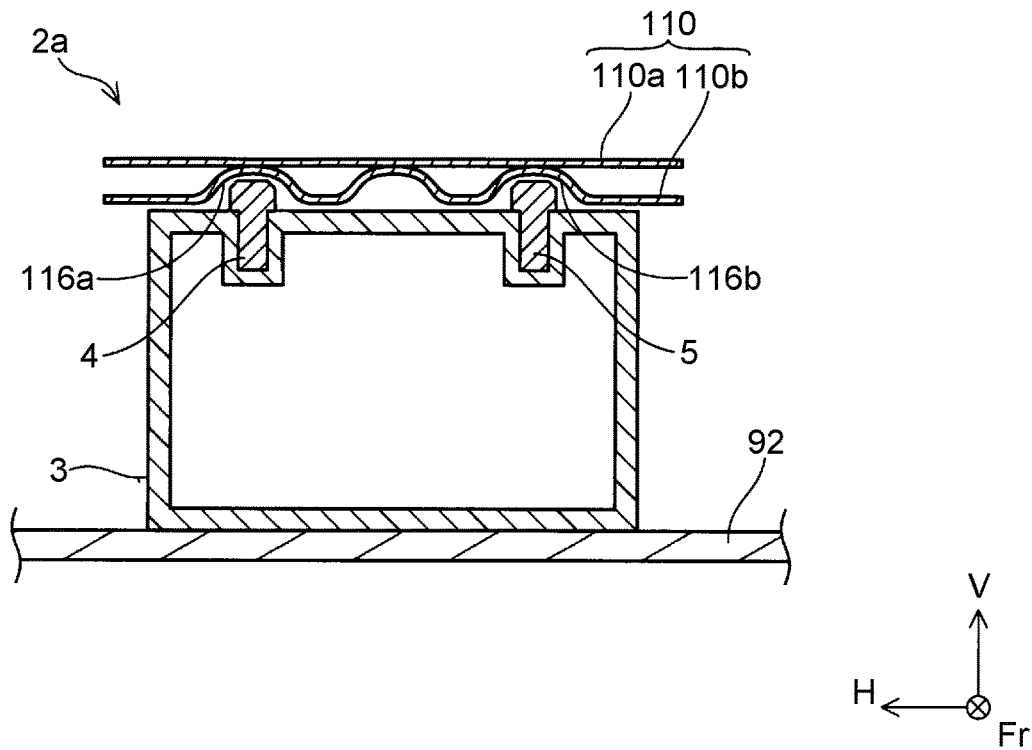
FIG. 5 is a sectional view of a protection cover of a modified example.

FIG. 5 shows a sectional view of a protection cover 110 of a modified example. FIG. 5 corresponds to the sectional view of FIG. 3. The protection cover 110 is formed by two metal plates (an upper metal plate 110a and a lower metal plate 110b) placed one on top of the other. The lower metal plate 110b is undulated, and corrugation is formed on a lower surface of the protection cover 110. The bolt 4 fixed to the upper surface of the inverter 3 is located under a recess 116a of the corrugation of the lower surface of the protection cover 110. The bolt 5 fixed to the upper surface of the inverter 3 is located under a recess 116b of the corrugation of the lower surface of the protection cover 110. An inverter protecting structure 2a of FIG. 5 can achieve effects similar to those of the inverter protecting structure 2 of the embodiment.

The following are notes on the technique having been described in the embodiment: The shape of the corrugation provided on the rear surface of the protection cover 10 is not limited. The positions of the bolts on the upper surface of the inverter 3 may also be any positions that are under the recessed portions of the corrugation. The protection cover may be formed by two metal plates placed one on top of the other, and corrugation may be provided on a lower surface of a lower metal plate as well as on an upper metal plate. In some embodiments, an extension direction of protrusions (ribs) of the lower metal plate and an extension direction of protrusions (ribs) of the upper metal plate intersect each other. Ribs that intersect each other as seen in a plan view from above can significantly enhance the strength of the protection cover. The corrugation of the lower surface of the protection cover may be beads that are formed at the same time as when the protection cover is produced by press working.

While the specific examples of the present disclosure have been described in detail above, the examples are merely illustrative and do not limit the scope of claims. The technique described in the claims includes various changes and modifications made to the specific examples illustrated above. The technical elements in the present disclosure or the drawings exhibit technical utility independently or in various combinations, without such combinations being limited to those described in the claims as filed. Moreover, the technique illustrated in the present disclosure or the drawings can achieve a plurality of objects at the same time, and has technical utility simply by achieving one of the objects.

What is claimed is:

1. An inverter protecting structure comprising:
    an inverter that is disposed at a rear part of a vehicle and is configured to supply driving electric power to a traction motor; and
    a protection cover that covers the inverter,
    wherein a surface of the protection cover facing an upper surface of the inverter has corrugation, and
    wherein a first bolt mounted on the upper surface is located under a recessed portion of the corrugation.

2. The inverter protecting structure according to claim 1, wherein the protection cover is fixed with a second bolt to a vehicle framework member located rearward of the inverter, and is inclined so as to slope upward toward a vehicle front side from a fixing position of the second bolt.

3. The inverter protecting structure according to claim 1, wherein a head of the first bolt is located under the recessed portion of the corrugation.

4. The inverted protecting structure according to claim 2, wherein the corrugation is formed by a plurality of ribs extending from the surface of the protection cover, and wherein a height of the ribs is larger than a height between the upper surface of inverter and the head of the first bolt.

5. The inverter protecting structure according to claim 1, wherein the corrugation is formed by a plurality of ribs that only extend from the surface of the protection cover facing the upper surface of the inverter.

6. The inverter protecting structure according to claim 5, wherein each of the plurality of ribs have a generally U-shape as seen from a plan view of the protective cover.

7. The inverter protecting structure according to claim 6, wherein spaces between the plurality of ribs corresponds to the recessed portion of the corrugation.

\* \* \* \* \*

UNITED STATES PATENT AND TRADEMARK OFFICE
CERTIFICATE OF CORRECTION

PATENT NO. : 10,784,752 B2
APPLICATION NO. : 16/265559
DATED : September 22, 2020
INVENTOR(S) : Aya Tokito It is certified that error appears in the above-identified patent and that said Letters Patent is hereby corrected as shown below:

On the Title Page

Item (72), inventor 1, city, delete "Toyota" and insert --Toyota-shi Aichi-ken--, therefor.

In the Specification

In Column 1, Line(s) 15, before "inverter", delete "a" and insert --an--, therefor.

In Column 1, Line(s) 24, before "unit", delete "an" and insert --a--, therefor.

In Column 1, Line(s) 62, before "inverter", delete "a" and insert --an--, therefor.

In Column 2, Line(s) 43, before "inverter", delete "a" and insert --an--, therefor.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*